No. 833,480. PATENTED OCT. 16, 1906.
C. P. NUTTER.
CHECK PROTECTOR.
APPLICATION FILED NOV. 14, 1905.
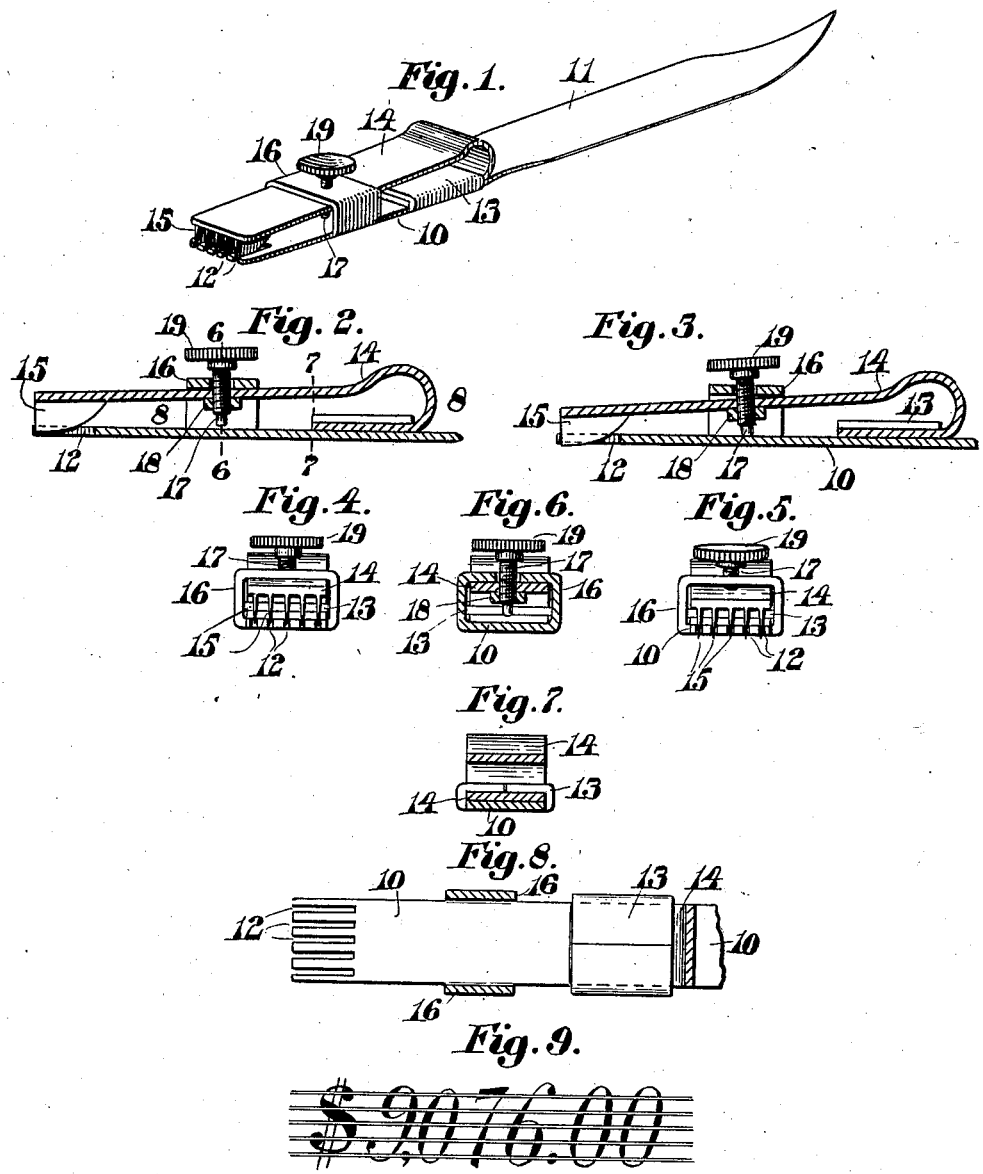
Witnesses:
Edwin T. Luer
Rowell F. Hatch
Inventor:
Charles P. Nutter,
by Walter E. Lombard,
Atty.

UNITED STATES PATENT OFFICE.

CHARLES P. NUTTER, OF MALDEN, MASSACHUSETTS.

CHECK-PROTECTOR.

No. 833,480.        Specification of Letters Patent.        Patented Oct. 16, 1906.

Application filed November 14, 1905. Serial No. 287,228.

*To all whom it may concern:*

Be it known that I, CHARLES P. NUTTER, a citizen of the United States of America, and a resident of Malden, in the county of Middlesex and State of Massachusetts, have invented certain new and useful Improvements in Check-Protectors, of which the following is a specification.

This invention relates to check-protectors, and has for its object the production of a device adapted to operate upon the characters written upon the check in such a manner as to prevent unscrupulous persons from changing the same without disclosing evidence on the face thereof of the tampering therewith.

The invention consists in certain novel features of construction and arrangement of parts, which will be readily understood by reference to the description of the drawings and to the claims to be hereinafter given.

Of the drawings, Figure 1 represents a perspective view of a device embodying the features of this invention. Fig. 2 represents a longitudinal section of the working parts of the same, shown with the blades in their normal position. Fig. 3 represents a similar view with the blades in operative position. Fig. 4 represents an end view of Fig. 2. Fig. 5 represents an end view of Fig. 3. Fig. 6 represents a section on line 6 6 on Fig. 2. Fig. 7 represents a section on line 7 7 on Fig. 2. Fig. 8 represents a section on line 8 8 on Fig. 2, and Fig. 9 represents the amount of a check after it has been operated upon by this device.

Similar characters designate like parts throughout the several figures of the drawings.

In the drawings, 10 represents a plate provided at one end with a handle 11, shown in the present case as forming a paper-cutter, and provided at the other end with a series of parallel slots or notches 12. By means of the clips 13, forming a part of the plate 10, is secured a spring-plate 14, provided at its free end with a plurality of downwardly-extending knife-blades 15, each of which coöperates with one of the slots or notches 12 in the guard-plate 10. The plate 10 is provided with a stirrup or other member 16, extending over the spring-plate 14 and limiting the outward movement of said plate 14, the spring of which tends to normally retain said plate in contact with the under side of said stirrup 16 in the position shown in Fig. 2, at which time th eedges of the blades 15 will be retained between the wall of the slots or notches 12, and thereby prevent the same from accidentally cutting, scratching, or otherwise injuring desks or other articles on which the same may be placed.

Adjustably secured to the plate 14 is a stop 17, maintained in adjusted position by the check-nut 18, said stop being adjusted in said plate 14, so that its end is normally slightly removed from the upper surface of the plate 10. When in the position shown in Fig. 3, with the end of said stop 17 in contact with said upper surface of the plate 10, the blades 15 will extend through the slots or notches 12 a sufficient distance to give the required cut. The outer end of the stop 17 is provided with a head 19, adapted to receive the thumb or finger of the operator to assist in the manipulation of the plate 14 to move the blades into operative position when it is desired to operate upon a check.

The blades 15 may be made integral with the plates 14, as shown in the drawings, or may be secured thereto, and it is obvious that these blades may be made of any desired shape without affecting the principles of this invention. It is also evident that the plate 14 may be made integral with the plate 10 or secured thereto, as shown in the drawings, or these two members may be joined together in any other desired manner provided they have a movement toward and from each other and are normally separated by a spring tension. Preferably this spring tension resides in one of the members 10 14; but it is obvious that without affecting the principles of the invention a separate member may be used, if desired. Normally the cutting edges of the blades 15 are thoroughly protected by means of the walls of the slots 12, in which said blades move; but when the pressure is brought to bear upon the head 19 to depress the plate 14 and cause the edges of the blades 15 to pass through the slots 12 into a position shown in Fig. 3 the tool may then be used to cut a plurality of grooves into the check through the written characters placed thereon, as shown in Fig. 9, so that it would be impossible for unscrupulous persons to tamper with the check without disclosing the fact to the most casual observer.

When the figures or other characters placed upon the check are operated upon by means of this protector, grooves are cut into the paper in such a manner through the figures or other characters that any attempt to raise or otherwise change the figures or other characters would result in the ink getting into one or more of the grooves and spreading, giving a blurred appearance and indicating at once that the check had been tampered with. Where the figures are placed upon the check and then operated upon by means of this device the parallel cuts are perfectly clean, and none of the ink will extend into the grooves formed by the knives. Where any attempt is made after the grooves have been cut to change the figures or other characters, no matter how carefully the work may be done a greater or less quantity of ink will be sure to pass down the side walls of these grooves, which will become plainly apparent upon close inspection.

The device is applicable also for use upon the signatures to checks, so that these cannot be tampered with. The use of the device, while it insures protection against raising the checks or changing the signature, does not injure the face of the checks nor cut through the same, which is very objectionable. The rear face of the check is left perfectly plain, so that all portions thereof may be used for indorsement when necessary.

It is believed that the invention will be thoroughly understood without further description.

I claim—

1. A check-protector adapted to be held in the hand and moved thereby across the face of the check consisting of two members movable toward and from each other, one of said members having a plurality of parallel knife-blades having inclined cutting edges.

2. A check-protector adapted to be held in the hand and moved thereby across the face of the check consisting of two members movable toward and from each other, one of said members having a plurality of parallel knife-blades having inclined cutting edges and the other having a plurality of slots coöperating with said blades.

3. A check-protector adapted to be held in the hand and moved thereby across the face of the check consisting of two members movable toward and from each other, one of said members having a plurality of parallel knife-blades extending longitudinally thereof and having inclined cutting edges.

4. A check-protector adapted to be held in the hand and moved thereby across the face of the check consisting of two members movable toward and from each other, a plurality of blades having inclined cutting edges upon one member, and means for limiting the movement of said members toward each other.

5. A check-protector adapted to be held in the hand and moved thereby across the face of the check consisting of two members movable toward and from each other, one of which is adapted to be normally held away from the other and one of which is provided with a plurality of knife-blades having inclined cutting edges.

6. A check-protector adapted to be held in the hand and moved thereby across the face of the check consisting of two members movable toward and from each other, one of which is adapted to be normally held away from the other and one of which is provided with a plurality of knife-blades having inclined cutting edges, and means for limiting the movement of said members toward each other.

7. A check-protector adapted to be held in the hand and moved thereby across the face of the check consisting of a member provided with a plurality of parallel knives having inclined cutting edges, and means for regulating the depth of cut of said knives.

8. A hand device for protecting checks consisting of a member provided with a plurality of parallel knives adapted to be drawn over the characters on the face of the check and cut lines therethrough, and means for regulating the depth of cut made by said knives.

9. A hand device for protecting checks consisting of a member provided with a plurality of parallel slots, a plurality of knives the edges of which are normally adapted to reside within said slots, and means permitting the forcing of the edges of said knives through said slots beyond the outer face of said slotted member.

10. A hand device for protecting checks consisting of a member provided with a plurality of parallel slots, a plurality of knives the edges of which are normally adapted to reside within said slots, means for limiting the movement of said knives, and means permitting the forcing of the edges of said knives through said slots beyond the outer face of said slotted member.

11. A hand device for protecting checks consisting of two substantially parallel members connected together normally separated by spring tension one of said members being provided with a plurality of parallel slots, a plurality of knives the edges of which are normally adapted to reside within said slots, and means permitting the forcing of the edges of said knives through said slots beyond the outer face of said slotted member.

12. A hand device for protecting checks consisting of two substantially parallel members connected together normally separated by spring tension one of said members being provided with a plurality of parallel slots, a plurality of knives the edges of which are normally adapted to reside within said slots, means for limiting the movement of said knives, and means permitting the forcing of the edges of said knives through said slots beyond the outer face of said slotted member.

Signed by me at Boston, Massachusetts, this 13th day of November, 1905.

CHARLES P. NUTTER.

Witnesses:
EDNA C. CLEVELAND,
WALTER E. LOMBARD.